ELECTRONIC AZIMUTH RESOLVER
Filed Sept. 14, 1966
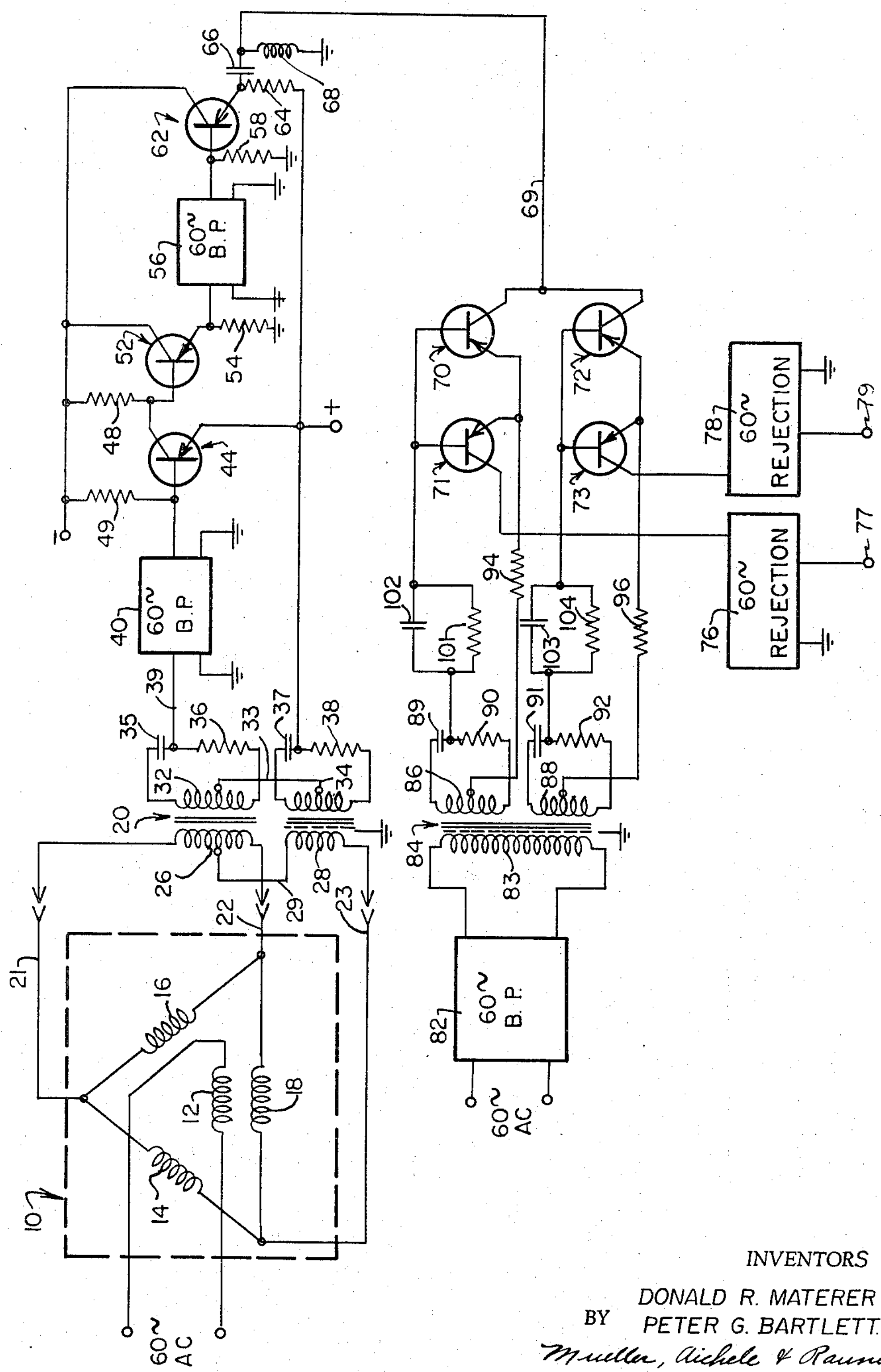
INVENTORS
DONALD R. MATERER
BY PETER G. BARTLETT
Mueller, Aichele & Rauner
ATTYS.

3,377,589

ELECTRONIC AZIMUTH RESOLVER

Donald R. Materer, Chicago, Ill., and Peter G. Bartlett, Bettendorf, Iowa, assignors to Motorola, Inc., Chicago, Ill., a corporation of Illinois Filed Sept. 14, 1966, Ser. No. 579,325
6 Claims. (Cl. 343—11)

ABSTRACT OF THE DISCLOSURE

A three-phase synchro output indicative of antenna azimuth is changed to a two-phase signal by a Scott connected transformer. The two secondary windings of the transformer are connected to a phase shifting network to provide carriers 90° out of phase with respect to each other. The phase shifted signals from the transformer secondaries are added to provide a resultant signal. The resultant signal is coupled to a phase sensitive demodulator, and compared to reference signals to provide outputs proportional to the sine and cosine of the antenna azimuth.

In many radar systems it is conventional to resolve information signals indicative of the azimuth of the scanning antenna into X and Y components to provide the necessary sweep and bearing signals for plan position indication (PPI) or similar display of incoming information. Systems using electromechanical servo mechanisms and accompanying electronic circuitry such as error sensing circuits and amplifiers are expensive and tend to be unreliable. In addition, such systems utilize heavy and bulky power consuming components such as servo motors and mechanical potentiometers which give rise to problems of inertia and impose accuracy limitations as the antenna scanning rate increases. Many of the limitations and difficulties encountered by use of electromechanical servo systems can be overcome by the use of an electronic system to resolve the azimuth information received from the antenna into the desired components for activation of the display device.

It is therefore an object of the present invention to provide an electronic system for resolving antenna azimuth information into X and Y components for use in the production of sweep and bearing information signals for a target display device.

Another object is to provide an electronic azimuth resolver for producing bearing information in response to an antenna syncro generator, which resolver retains its accuracy over wide variations of syncro excitation voltage.

A further object is to provide an electronic system to resolve the information received from a three wire antenna syncro generator into sine and cosine components for application to a plan position target display device.

A feature of the invention is the provision of means to convert the output of an antenna syncro generator into two out-of-phase signal components, which components are provided with a phase shift to establish a 90° phase difference with respect to each other. The two components are subsequently added to produce a resultant signal of constant amplitude which is applied to a demodulator to provide a pair of analog outputs indicative of the sine and cosine of the antenna azimuth angle.

Another feature is the provision, in the above-described system, of a Scott connected transformer to convert the output of a three-wire antenna syncro generator into a two-phase output which may be utilized to establish signals indicative of the X and Y components of the antenna bearing position.

A further feature is the provision of a signal level clipping means to make a combined signal which is indicative of antenna bearing position independent of amplitude variations of syncro excitation voltage and an amplitude insensitive demodulator to demodulate the combined antenna bearing information signal against reference signals to establish sine and cosine signals indicative of the antenna bearing position.

Other objects, features and attending advantages of the invention will become apparent from the following description when taken in conjunction with the accompanying drawing which is a schematic representation of an electronic azimuth resolver in accordance with the invention.

In practicing the invention a remote bearing syncro generator, positioned at the radar antenna, is energized from a convenient source such as a 60 cycle line voltage. The rotor of the syncro generator rotates with the scanning antenna and voltages are induced in each of the three stator windings to provide signals having a magnitude which is a function of the antenna azimuth position. The three syncro outputs are connected to respective windings of a transformer adapted to provide three-phase to two-phase transformation. The transformer secondary includes one winding with a 60 cycle carrier having an amplitude modulation proportional to the sine of the bearing angle of the antenna and another winding with a 60 cycle carrier having an amplitude modulation proportional to the cosine of the bearing angle of the antenna. These two secondary outputs are connected to phase shifting networks to provide carriers 90° in phase with respect to one another, and are then added to provide a resultant component having a constant amplitude carrier whose frequency is equal to the frequency of the 60 cycle carrier minus the frequency of antenna rotation. This resultant is clipped to make it independent of amplitude variations of syncro excitation voltage and subsequently filtered to remove distortion introduced by the clipping action and to return it to a sinusoidal waveform. The filtered resultant is then coupled to a phase sensitive demodulator and compared to reference signals to provide outputs respectively proportional to the sine and cosine modulation provided by the antenna azimuth bearing position. These sine and cosine outputs represent resolved X and Y components of the antenna bearing position for application to corresponding sweeps on the target display device.

The schematic diagram of FIG. 1 illustrates a particular circuit embodiment of the electronic azimuth resolver of the present invention, As is conventional practice, a three winding syncro generator, shown generally at 10, is located at the scanning antenna of a radar complex, with rotor winding 12 mechanically coupled to the antenna and adapted to rotate therewith. Rotor winding 12 is further excited from a convenient source such as a 60 cycle line voltage, and accordingly voltages are induced in each of stator windings 14, 16 and 18. These induced voltages are carrier signals at line voltage frequency, modulated with sinusoidal envelopes that are indicative of antenna rotation. Although shown as delta connected, it is to be understood that syncro generator 10 may also be connected in the Y configuration. It is to be noted that in operation the syncro stator voltages induced as a result of rotor excitation are either in-phase or 180° out-of-phase with the exciting line voltage, while the sinusoidal modulation voltages applied thereto in response to antenna rotation differ in phase by 120°. In this sense the modulation envelopes applied to the voltages induced in windings 14, 16 and 18 may be considered three phase signals.

The output of syncro generator 10 is connected on leads 21, 22 and 23 to the primary windings of transformer 20, located at a point remote from the antenna in the radar complex. It is to be understood that in addition to direct electrical connections, the syncro output voltages conveyed by leads 21, 22 and 23 may be telemetered to the location of transformer 20 by a suitable data link. Transformer 20 comprises a pair of balanced primary windings 26 and 28, such that signals on leads 21 and 22 are coupled across one primary winding and signals on lead 23 are connected to one side only of the other primary winding. Jumper lead 29 connects the mid-point of primary winding 26 to the .866 tap point on primary winding 28 to complete the primary connections of transformer 20.

The secondary of transformer 20 includes a pair of balanced secondary windings 32 and 34. With the primary connected in the above described manner the line frequency carrier signals, containing three-phase modulation appearing on leads 21, 22 and 23, are transformed to first and second carrier signals appearing across secondary winding 32 and 34. These carriers now have two-phase modulation, with the amplitude modulation appearing on the output of winding 32 in 90° phase relationship with the amplitude modulation appearing on winding 34. When referred to a convenient reference the modulation amplitude of the signal appearing across winding 32 may be considered proportional to the sine of the gearing angle of the antenna while the modulation amplitude of the output of winding 34 may be considered proportional to the cosine of the bearing angle of the rotating antenna.

As previously noted, the line frequency carrier output of each winding of syncro 10, as distinguished from the amplitude modulation imparted thereto, is either in-phase or 180° out-of-phase as appearing on leads 21, 22 and 23. Accordingly, the carrier signal outputs of windings 32 and 33 retain this phase relationship, with the three-phase to two-phase (or Scott) transformation provided by transformer 20 applicable to their sinusoidal envelope modulation.

By providing each of windings 32 and 34 with phase shift networks including capacitor 35 and resistor 36, and capacitor 37 and resistor 38, respectively, there is further provided a 90° phase shift between the carrier frequency signal appearing across the two outputs of Scott connected transformer 20. The phase shift networks are tuned with the inductances of windings 32 and 34 to carrier frequency, and the inclusion of resistors 36 and 38 provide a very low Q and hence a pass-band of constant amplitude over a broad frequency range so that the relatively low frequency modulation components produced by antenna rotation can be readily passed without introducing further phase shift or amplitude distortion.

By connecting the mid-points of secondary windings 32 and 34 together by lead 33, their two outputs are added so that there appears at the junction point of capacitor 35 and resistor 36, on lead 39, a signal which is a constant amplitude resultant signal whose frequency is the frequency of the carrier minus the frequency of antenna rotation. This resultant signal is filtered by pass band filter 40 to eliminate harmonic distortion and clipped by an amplitude limiter including transistor 44. Transistor 44 is connected as a base input amplifier stage with collector and base voltages supplied from a negative source through resistors 48 and 49, respectively, and with its emitter electrode connected to a positive reference potential. Values are selected to bias transistor 44 near saturation so that when input signals of a predetermined level are reached it becomes saturated. As a result, transistor 44 clips the level of signals supplied to its base electrode by filter 40 to insure that the constant amplitude resultant is independent of line voltage variations of the energization source of syncro generator 10.

Transistor 52, connected in the emitter follower configuration, develops the output of transistor 44 across resistor 54 for impedance matching with the input of pass band filter 56. The output of filter 56 is developed across resistor 58 and coupled to emitter follower transistor 62 to provide a signal across resistor 64. This signal is fed to a further filtering arrangement comprising capacitor 66 and inductor 68. The filtering provided by pass band filter 56, as well as the filtering provided by capacitor 66 in resonance with inductor 68, eliminates harmonic distortion produced by the clipping action of transistor 44 and returns the resultant waveform to a sine wave. Resistors 58 and 64 load the filter circuits to provide a pass band broad enough to pass the modulation components introduced by antenna rotation without further phase shift or amplitude distortion.

The clipped and filtered constant amplitude resultant signal is coupled on lead 69 to a phase sensitive demodulation circuit including transistors 70, 71, 72 and 73. The demodulator is provided with reference voltages that are in phase with the carrier signal outputs of windings 32 and 34 on transformer 20 to demodulate the resultant signal and provide outputs which are indicative of the sine and the cosine of the antenna azimuth position. The output of transistor 71 is connected to low pass filter 76, which removes high frequency components that may be left from the demodulation, to provide at terminal 77 a DC analog voltage which is proportional to the sine of the antenna azimuth position. In a like manner, the output of transistor 73 is connected to low pass filter 78 and provides at terminal a DC analog voltage which is proportional to the cosine of the antenna azimuth position.

The reference voltages for the demodulation circuit are derived from the energization source for rotor 12 of the syncro generator. A portion of the rotor energization voltage is coupled through pass band filter 82 to the primary winding 83 of transformer 84. Secondary windings 86 and 88 of transformer 84 are provided with phase shift networks including capacitor 89 and resistor 90, and capacitor 91 and resistor 92. These networks produce phase shifts corresponding to those associated with windings 32 and 34 of transformer 20, and accordingly provide output signals of carrier line frequency which are 90° in phase relationship with each other. The output developed across winding 86 is in phase with the output developed across winding 32 and hence provides a reference for the sine component of the antenna azimuth information signal. Correspondingly the output of winding 88 is in phase with the output of winding 34 and hence provides a reference signal for the cosine component of the antenna azimuth information signal. The sine reference signal is coupled from the mid-point of winding 86 to the common junction of the emitters of transistors 70 and 71 by resistor 94 while the cosine reference signal is coupled from the mid-point of winding 88 to the common junction of the emitters of transistors 72 and 73 by resistor 96. A further phase shift network including resistor 101 shunted by capacitor 102 couples the junction point between capacitor 89 and resistor 90 to the commonly connected base electrodes of transistors 70 and 71, while the phase shift network including resistor 103 shunted by capacitor 104 couples the junction of capacitor 91 and resistor 92 to the commonly connected base electrodes of transistors 72 and 73. These latter two phase shift networks compensate for phase shift introduced by the loading effects of transistor 70, 71, 72, and 73 when switched to conduction.

In operation series connected transistors 70 and 71 function as a switch to pass a portion of the resultant signal appearing on lead 69 to filter 76 and series connected transistors 72 and 73 function as a switch to pass a portion of the resultant signal appearing on lead 69 to filter 78. When synchronously gated by the phase shifted outputs of windings 86 and 88 the signals passed by transistors 70 and 71 occur in phase coincidence with the modulation indicative of the sine of the antenna bearing angle imparted to the carrier signal and the signals passed by transistors 72 and 73 occur in phase coincidence with the modulation indicative of the cosine of the antenna bearing angle imparted to the carrier signal. Filters 76 and 78 reject the 60 cycle carrier and harmonics thereof and pass only signals indicative of antenna rotation, which signals take the form of DC analog voltages proportional to the sine and the cosine of the antenna azimuth bearing, as appears at terminals 77 and 79, respectively.

To understand the manner in which a constant amplitude carrier having a frequency which is the frequency of the synchro energization voltage minus the frequency of antenna rotation is derived from the output of transformer 20, consider that $\omega_m$=the rotation frequency of the antenna
$\omega_c$=the synchro energization frequency
$E_c$=carrier voltage=$\sin \omega_c t$
$E_m$=modulating voltage (antenna rotation)=$\cos \omega_m t$ The phase shifted output of winding 32 is:

$$E_1 = \sin \omega_c t \sin \omega_m t$$

The phase shifted output of winding 34 is:

$$E_2 = \cos \omega_c t \cos \omega_m t$$

The sum of these two voltages as appearing on lead 39 is:

$$\begin{aligned} E_1+E_2 &= \sin \omega_c t \sin \omega_m t + \cos \omega_c t \cos \omega_m t \\ &= \tfrac{1}{2} \cos (\omega_c - \omega_m)t + \cos (\omega_c + \omega_m)t \\ &\quad + \tfrac{1}{2} \cos (\omega_c - \omega_m)t - \cos (\omega_c + \omega_m)t \\ &= \cos (\omega_c - \omega_m)t \end{aligned}$$

It can be seen from the above that the resultant of signals $E_1$ and $E_2$ provide a signal of constant amplitude having a frequency which is equal to the frequency of the synchro energization voltage ($\omega_c$) minus the frequency of antenna rotation ($\omega_m$). Since the carrier and the antenna rotation are at different frequencies this results in a phase shifted single sideband carrier, with the phase shift or phase modulation indicative of antenna rotation. When demodulated in a phase sensitive demodulator as described above, the sine and the cosine modulation imparted to each component making up the resultant phase shifted carrier can be derived on separate lines to provide the desired X and Y analog voltages for azimuth and sweep information for the display system.

The invention provides therefore an electronic azimuth resolver of economical construction utilizing a large number of passive circuit elements to provide a high degree of reliability. The resolved X and Y components of the antenna azimuth information are obtained without the use of complex and expensive electromechanical servo systems, and produce analog DC outputs which are substantially independent of line voltage variation of the source energizing the antenna syncro generator.

We claim:

1. Apparatus for providing analog signals indicative of the X coordinate and the Y coordinate of the azimuth angle of a rotating antenna, said apparatus including in combination, means for receiving the output of an antenna driven syncro generator and providing first and second antenna information signals in response thereto, with said first antenna information signal comprising a carrier having amplitude modultion indicative of the sine of the azimuth angle of said antenna and said second antenna information signal comprising a carrier in phase quadrature having amplitude modulation indicative of the cosine of the angle of said antenna, summing means, first circuit means coupling said means for receiving to said summing means, said summing means being responsive to said first and second antenna information signals to provide a resultant signal having a constant amplitude and a frequency representative of the difference between the frequency of said carrier and the frequency of antenna rotation, phase sensitive demodulation means, second circuit means coupling said summing means to said phase sensitive demodulation means for applying said resultant signal thereto, and reference signal generating means for developing first and second reference signals and coupling the same to said phase sensitive demodulation means to thereby produce first and second DC analog signals representative of the sine and cosine of the antenna azimuth angle.

2. The apparatus of claim 1, wherein said means for receiving includes first and second output terminals for providing said first and second antenna information signals respectively, said first circuit means includes phase shift network means coupling said first and second output terminals to said summing means, said phase shift network means acting to provide the carrier of said first and second antenna information signals with a 90° phase relationship, and said first and second reference signals correspond in phase and frequency to the phase shifted carriers of said first and second antenna information signals respectively.

3. The apparatus of claim 2, wherein said second circuit means includes amplitude limiting means coupling said summing means to said phase sensitive demodulation means.

4. Means for resolving antenna azimuth information signals into X and Y components including in combination, a syncro generator mechanically coupled with said antenna to provide three carrier signals having three phase sinusoidal envelope modulation indicative of the angular position of the antenna, transformer means coupled to said synchro generator to receive said three phase modulated signals and convert the same to first and second carrier signals having two phase envelope modulation, with the modulation of said first converted carrier signal being indicative of the sine of the azimuth angle of the antenna and the modulation of said second converted carrier signal being indictaive of the cosine of the azimuth angle of the antenna, phase shift means coupled to said transformer means to provide a corresponding quadrature phase relationship between said first and second carrier signals, summing means coupled to said phase shift means and responsive to said phase shifted signals to provide a resultant signal of constant amplitude of a frequency corresponding to the difference between the frequency of said carrier and the frequency of antenna rotation, phase sensitive detection means coupled to said summing means and reference circuit means coupling first and second reference signals corresponding in phase and frequency to said first and second converted and phase shifted carrier signals respectively to said phase sensitive detection means, said phase sensitive detection means being responsive to said resultant signal and said first and second reference signals to develop DC analog signals representative of the X and Y components of said antenna information signals.

5. The apparatus of claim 4, wherein said phase sensitive detection means includes, first and second switching means with a common input and first and second outputs, said reference circuit means includes first circuit means coupled to said first switching means for providing a first reference signal thereto, said first reference signal corresponding in phase and frequency with said first phase shifted carrier, and second circuit means coupled to said second switching means for providing a second reference signal thereto, said second reference signal corresponding in phase and frequency with said first phase shifted carrier, and filter means coupled to said outputs of said phase sensitive detection means to remove the carrier frequency therefrom.

6. The apparatus of claim 4, wherein said synchro generator includes stator windings coupled to said transformer windings and a rotor mechanically coupled with said antenna and adapted to be excited with an AC voltage to induce carrier signals having amplitude modulation indicative of the rotation of the antenna in said stator windings.

References Cited

UNITED STATES PATENTS

| | | | |
|---|---|---|---|
| 2,624,043 | 12/1952 | Gerwin et al. | 343—11 X |
| 2,900,632 | 8/1959 | Arkus | 343—10 |
| 3,156,907 | 11/1964 | Lanning et al. | 340—198 |
| 3,244,961 | 4/1966 | Adler | 340—198 X |

RODNEY D. BENNETT, *Primary Examiner.*

M. F. HUBLER, *Assistant Examiner.*